C. MOORE.
Assignor, by mesne assignments, to HYDRO PNEUMATIC PUMP COMPANY.
AIR PUMP.
No. 10,374. Reissued Aug. 28, 1883.
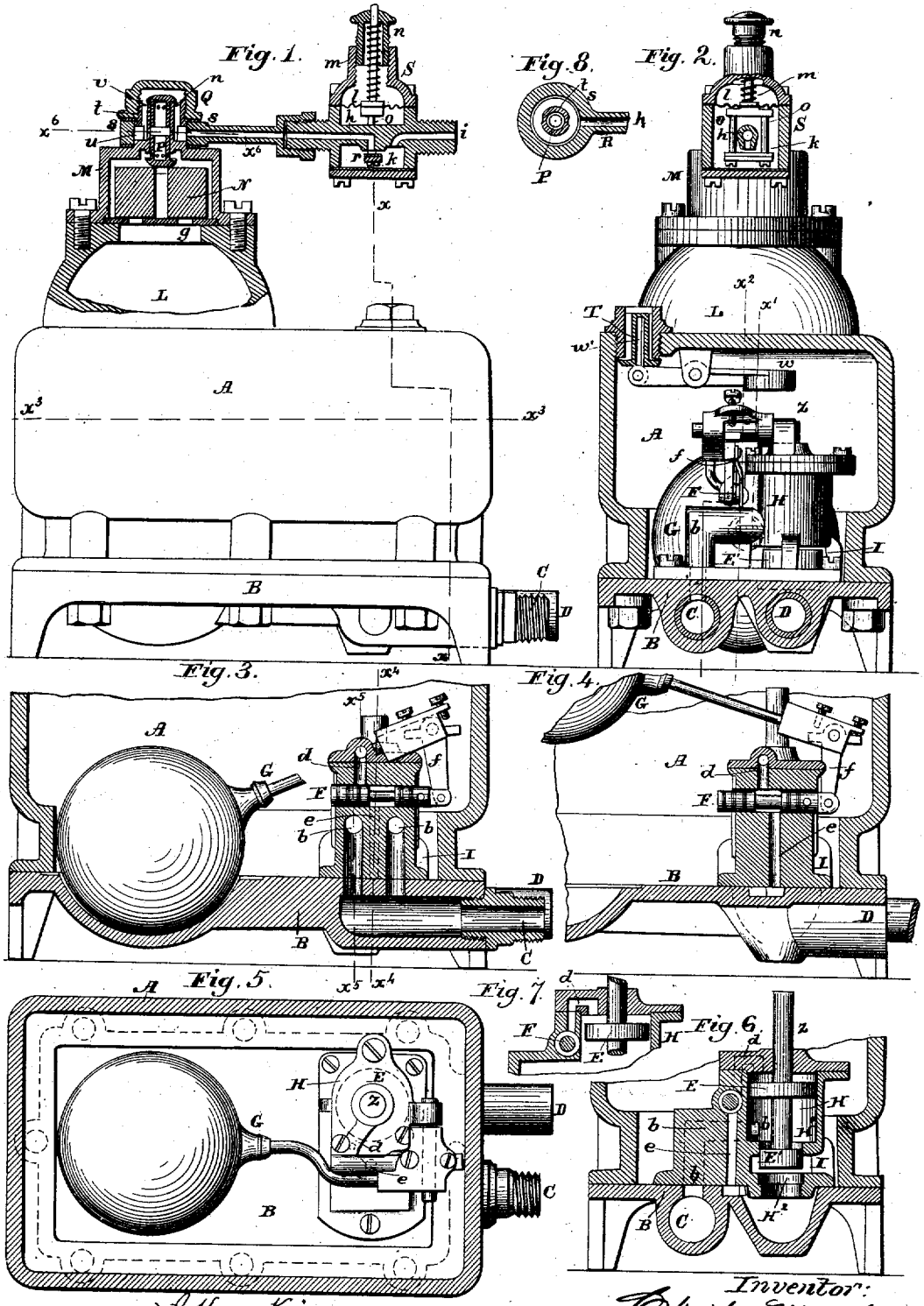
Witnesses: J. Henry Kaiser. Geo. T. Kelly.
Inventor: Charles Moore, by Collier & Bell Attys
N. PETERS. Photo-Lithographer, Washington, D. C.

UNITED STATES PATENT OFFICE.

CHARLES MOORE, OF PHILADELPHIA, PA., ASSIGNOR, BY MESNE ASSIGNMENTS, TO HYDRO PNEUMATIC PUMP COMPANY, OF NEW YORK, N. Y.

AIR-PUMP.

SPECIFICATION forming part of Reissued Letters Patent No. 10,374, dated August 28, 1883.

Original No. 216,211, dated June 3, 1879. Application for reissue filed June 4, 1883.

*To all whom it may concern:*

Be it known that I, CHARLES MOORE, formerly of the city and State of New York, but now residing at Philadelphia, in the county of Philadelphia and State of Pennsylvania, have invented certain new and useful Improvements in Air-Compressors, of which improvements the following is a specification.

This invention consists in certain novel constructions and combinations of parts in a hydraulic compressor, whereby the action of the main valve, which admits and discharges water to and from the air-compressor, is governed by an auxiliary valve actuated by a float.

The invention also consists in various novel constructions and combinations of parts, whereby water is prevented from being discharged along with the compressed air. Said air may be more conveniently discharged in various directions; also, a very perfect action of the valve which admits air to the compressing-chamber is obtained.

In the accompanying drawings, Figure 1 represents a partly sectional side elevation of an apparatus constructed in accordance with my invention. Fig. 2 is a vertical transverse section on the irregular line $x\ x$ in Fig. 1. Fig. 3 is a longitudinal vertical section, in part, on the irregular line $x'\ x'$ in Fig. 2. Fig. 4 is also a longitudinal vertical section, in part, on the line $x^2\ x^2$ in Fig. 2. Fig. 5 is a horizontal section on the line $x^3\ x^3$ in Fig. 1. Fig. 6 is a vertical section, in part, on the line $x^4\ x^4$ in Fig. 3; and Fig. 7, also a vertical section, in part, on the line $x^5\ x^5$ in Fig. 3. Fig. 8 is a horizontal section on the line $x^6\ x^6$ in Fig. 1.

A close air-compressing tank or chamber, A, is mounted on a bed-plate, B, which latter is provided with a water-inlet, C, and a water-outlet, D. The water, under any suitable head or pressure, is admitted by the inlet C to the tank A and discharged from the latter through the outlet D by the automatic action of a differential piston-valve, E E′, and an auxiliary valve, F, the latter of which is controlled by a lever-float, G, within the tank A. The upper or larger piston, E, of the valve E E′ is arranged to work freely up and down within an upper covered cylinder, H, with which the inlet C connects by one or more passages, *b*, below the piston E or between the latter and the smaller piston E′. Said larger piston E is made to fit loosely within the cylinder H, or, instead thereof, may have one or more small perforations through it, to provide for the water which enters the cylinder H by the passage *b* leaking past or through it to the space above said piston in the cylinder H, the object of which will be hereinafter explained. Thus the piston E is purposely a leaking one; but the smaller piston E′, which is attached by a rod to the former, is a close-fitting one, within a lower and interrupted cylindrical chamber, $H'\ H^2$, which forms a reduced lower continuation of the bore of the cylinder H, and communicates below with the outlet D, also by one or more intermediate passages, I, with the tank A. The piston E′, when raised, opens the lower portion, $H^2$, of the cylindrical chamber, or continuation $H'\ H^2$ of the cylinder H, also the passage I, which connects with the tank A, to the exhaust-outlet D, thereby providing for the escape of water from the tank A. The lowering of said piston E′ within the lower portion, $H^2$, of the cylindrical chamber $H'\ H^2$ closes the communication with the exhaust-outlet D, and so shuts off further escape of water from the tank A and opens communication by the passages *b* and I with the inlet C for supplying the tank A with water. The water, as it rises in the tank, compresses the air in the upper portion of the latter, as in other hydraulic air-compressors.

The alternate charging of the tank A with water and exhaustion of the latter therefrom by the rising and falling of the differential piston-valve E E′ is controlled by the action of the float G through the intervention of an auxiliary valve, F, with which said float is connected. This auxiliary valve does not, as in other hydraulic air-compressors, control the admission of water to or through the main valve, which is here represented by the differential piston-valve E E′, but controls an upper exhaust-outlet, *d*, from said main valve and a lower outlet, *e*, in communication with the general exhaust-outlet D. The outlet-passage *e* is arranged in the same vertical central plane, or thereabout, as that of the axis of the cylinder H, while the outlet-passage *d* occupies a position to one side of said axis, and the auxiliary valve F, which may be a cylindrical one, is constructed to control said passages *d* and *e*, respectively, as it is longitudinally moved first in one direction and then in the other.

The action of these parts, so far as the compression of air in the tank A by the alternate rise and fall of water in the tank A is concerned, is as follows: Water, under pressure, entering by the inlet C and passage *b* within the cylinder H, acts upon the under side of the larger piston E of the differential piston-valve E E′ to partly raise it, thereby causing the smaller piston E′ to close the passage or cylindrical continuation H′. The auxiliary valve F is then in a position to close the upper outlet-passage, *d*, from the cylinder H. The larger piston E, being a leaking one, passes inlet-water from below it to the space above it in the cylinder H. This causes an equalization of pressure on opposite sides of the piston E and a downward force or pressure of the water on the upper surface of the smaller piston E′, which depresses the main valve E E′, closes the exhaust by the cylindrical portion $H^2$ of the chamber H′ $H^2$ to the outlet D, and opens the passage I for inlet-water entering by the passage *b* to escape into and charge the tank A, and so compress the air in the tank. As the water rises in the tank it of course lifts the float G, and this, in its turn, by a suitable trip-motion lever, *f*, moves the auxiliary valve F to open the upper outlet-passage, *d*, of the cylinder H, as shown in Fig. 4. This allows the water above the larger piston E in the cylinder H to escape to the outlet D by the passage *e*, which latter is never closed by the valve F. The excess of pressure then being on the under side of the larger piston E, the differential piston-valve E E′ is raised, thereby causing the passage or chambered continuation H′ to be closed by the smaller piston, E, which shuts off ingress of any further inlet-water to the tank, and opens the passage I to the lower chambered continuation, $H^2$, and allows the water in the tank to escape by the outlet D. As the water falls in the tank the float G descends with it, and, by means of the trip-motion lever *f*, adjusts the auxiliary valve F to its normal position of closing the upper exhaust-outlet, *d*, from the cylinder H, after which the action of charging the tank with water is repeated, as before.

By restricting the auxiliary valve F to exhausting the water from the upper surface of the piston E to reverse the action of the main valve E E′, and by the supply through or past the upper leaking piston, E, of the inlet-water, all foreign matter is excluded from the auxiliary valve to interfere with the action of the latter.

The float proper of the lever-float G it is proposed to make of hard rubber, whereby leakage of the float to interfere with its action is avoided.

L is a compressed-air chamber, mounted on the tank A. Within a close bonnet, M, erected on said air-chamber L, is a perforated float, N, which closes when down on a perforated plate, *g*, in the bottom of said bonnet.

P is a hollow perforated valve, closing upward, and arranged to rest upon the float N. This valve P, when open, is in communication, through a check-valve, Q, with a delivery duct or nozzle, R, for the compressed air; but when closed by an extreme rising of the float N serves to exclude water accidentally or excessively introduced within the tank A from passing off by the delivery-duct R. The compressed air passing off by the duct or nozzle R as the water rises in the tank A, is delivered at any required place through a pressure-regulator, S, which serves to equalize or regulate the pressure. This pressure-regulator, which is of peculiar construction, is the subject of Letters Patent of the United States No. 234,051, granted and issued to Henry C. Sergeant and George R. Cullingworth, (as my assignees,) under date of November 2, 1880.

To provide for the distribution of the compressed air in any required direction, the inner end of the delivery duct or nozzle R is constructed in the shape of a ring, *s*, which is free to turn round or about an annular distributing-groove, *u*, in and around a hollow stem, *t*, through which the compressed air is supplied, and so that said air, after passing down through orifices *v* in said stem, enters the annular groove *u*, and from thence passes off by the duct or nozzle R in any required direction, according to the circular adjustment of the ring *s* of the duct or nozzle R around the annularly-grooved stem *t*.

T is the valve through which air is admitted to the tank A, for the purpose of keeping up a continuous or repeated action. This valve has a spring or weighted lever, *w*, applied to close it, whereby it is kept tighter or more secure against leakage than when simply dependent upon the pressure of the air in the tank to close it. The lever *w* is not positively connected with the valve T, but the latter simply rests on said lever, which is shown provided with a stem, *w′*, free to slide up and down within said valve. A rod, *z*, of the main valve E E′ strikes, as the latter rises, the weighted lever *w*, and moves said lever, so as to relieve it from its support or closing hold of the valve T, but does not directly open the valve T, simply takes load off the latter, and leaves it free to open whenever the pressure in the chamber acting on the back of the valve T is so far reduced that the ordinary atmospheric pressure on the face or opposite side of said valve will open it. Thus the air-valve T is not necessarily opened every time the rod *z* of the main valve completes its ascent, but is only relieved of the weight which holds it more securely closed, so that said air-valve is free to open independently should the pressure in the chamber A require it. Were the valve T to be opened every time the rod *z* rose there would not unfrequently be a great waste and escape of compressed air from the chamber A.

I claim as my invention and desire to secure by Letters Patent—

1. The combination, substantially as set forth, of an air-compressing chamber, a main valve, which admits and discharges water to and from said chamber, and an auxiliary valve, which acts to relieve or reduce the internal pressure upon the main valve by opening an outlet from the chamber, these members being combined for joint operation to enable the exhausting movement of the main valve to be effected by reason of the reduction of pressure in the chamber due to the movement of the auxiliary valve.

2. The combination, with a main valve cylinder or chamber, of a main differential piston-valve having its larger piston constructed or fitted within said chamber to establish leakage from its one side or face to the opposite side or face thereof, a hydraulic air-compressing chamber to and from which the water is alternately admitted and withdrawn by the main valve, and an auxiliary valve actuated by a float and governing the action of the main valve by controlling the outlet from that side of the larger piston to which water is supplied by leakage, essentially as described.

3. The combination, with the air-compressing chamber of a hydraulic air-compressor, of the float N, the delivery-valve P, closed by the rising of said float, the check-valve Q, and a delivery-duct for the compressed air discharged through the check-valve, substantially as and for the purpose specified.

4. The circularly-adjustable delivery duct or nozzle R, in combination with a hollow compressed air-supplying stem or support having an annular distributing-groove, *u*, in it, around which the duct R is made capable of motion for varying the direction in the discharge of the compressed air by said duct or nozzle, essentially as described.

5. The combination, with an air-compressing chamber of a hydraulic air-compressor, and with a valve for controlling the supply and discharge of water to and from said chamber, of an air-inlet valve to the latter, and a detached weighted lever or loading device applied to said air-valve, and arranged for operation independently of it by the water supply and discharge valve, substantially as and for the purposes specified.

CHARLES MOORE.

Witnesses:

J. SNOWDEN BELL,

GEO. T. KELLY.